United States Patent
Brendley

(10) Patent No.: US 12,320,889 B2
(45) Date of Patent: Jun. 3, 2025

(54) SCALABLE NETWORKED ACTIVE PROTECTION (SNAP)

(71) Applicant: Artis, LLC, Herndon, VA (US)

(72) Inventor: Keith Brendley, Herndon, VA (US)

(73) Assignee: Artis, LLC, Herndon, VA (US)

( * ) Notice: Subject to any disclaimer, the term of this patent is extended or adjusted under 35 U.S.C. 154(b) by 334 days.

(21) Appl. No.: 17/895,894

(22) Filed: Aug. 25, 2022

(65) Prior Publication Data

US 2023/0161028 A1 May 25, 2023

Related U.S. Application Data

(60) Provisional application No. 63/236,990, filed on Aug. 25, 2021.

(51) Int. Cl.
| | |
|---|---|
| *G01S 13/66* | (2006.01) |
| *F41H 11/02* | (2006.01) |
| *G01S 13/88* | (2006.01) |
| *F41H 5/007* | (2006.01) |
| *G01S 7/02* | (2006.01) |
| *G01S 7/03* | (2006.01) |
| *G01S 7/35* | (2006.01) |

(52) U.S. Cl.
CPC ............ *G01S 13/66* (2013.01); *F41H 11/02* (2013.01); *G01S 13/883* (2013.01); *F41H 5/007* (2013.01); *G01S 7/027* (2021.05); *G01S 7/03* (2013.01); *G01S 7/35* (2013.01)

(58) Field of Classification Search
CPC .......... G01S 13/66; G01S 13/883; G01S 7/03; G01S 7/35; G01S 7/027; F41H 11/02; F41H 5/007
See application file for complete search history.

(56) References Cited

U.S. PATENT DOCUMENTS

| | | | |
|---|---|---|---|
| 2006/0283317 A1* | 12/2006 | Melnychuk | F41G 3/147 89/41.03 |
| 2008/0191926 A1* | 8/2008 | Benayahu | H04N 7/18 342/55 |

(Continued)

OTHER PUBLICATIONS

Army_and_Marine_Corps_Active_Protection_System_APS_Efforts (Year: 2016).*

(Continued)

*Primary Examiner* — Timothy A Brainard
*Assistant Examiner* — Ismaaeel A. Siddiquee
(74) *Attorney, Agent, or Firm* — Nixon & Vanderhye P.C.

(57) ABSTRACT

A new kind of active protection system (APS) called SNAP (scalable networked active protection) will be a light and affordable means of protecting vehicles and infrastructure against rockets and missiles. The APS system is built from modules, each of which is itself a stand-alone APS. Since each unit is a stand-alone APS, the only single points of failure are the User Interface (UI) in the vehicle cab and the Data/Power Router (DPR). SNAP instead takes advantage of each module protecting a relatively small area to employ vastly lower cost components. In addition, each SNAP module is disposable in that when its countermunition is initiated, the entire module is consumed and subsequently replaced in the field. This approach allows the system to be very compact and lightweight.

18 Claims, 20 Drawing Sheets

SNAP modules forming a protective barrier around a vehicle

(56) References Cited

U.S. PATENT DOCUMENTS

2012/0217301 A1* 8/2012 Namey ..................... F41G 3/04
                                                                235/411
2021/0333359 A1* 10/2021 Grigsby ............... H01Q 21/065
2022/0097843 A1*  3/2022 Degani .................. F41H 11/02

OTHER PUBLICATIONS

Matthaei, R., Rieken, J., & Maurer, M., "Benefits of Using Explicit Ground-Plane Information for Grid-based Urban Environment Modeling", 18th International Conference on Information Fusion, pp. 2049-2056, Jul. 6-9, 2015.

Abdul Rachman, A., "3D-Lidar Multi Object Tracking for Autonomous Driving—Multi-target Detection and Tracking under Urban Road Uncertainties", Master of Science Thesis, Delft University of Technology, Nov. 9, 2017.

X. Zhang, W. X., "Efficient L-shape Fitting for Vehicle Detection Using Laser Scanners", IEEE Intelligent Vehicles Symposium (IV), 54-59, 2017.

* cited by examiner

*SNAP modules forming a protective barrier around a vehicle*

*SNAP deployed to protect building from direct fire missile attack.*

SNAP module depiction with uTOF, proximity sensor and CM

*SNAP system architecture*

*3D point cloud from 3D Sensor*

*Concept design of SNAP Sensor*

*3D Sensor process flow*

*Tracking multiple objects using multiple sensors*

*Proximity sensor wire diagram*

Enhanced CMM concept with spreading munitions

FIG. 11 (Prior Art) *Iron Curtain User Interface*

*UI may potentially be implemented with existing vehicle switches*

*System Commander display on left, and notional view of SNAP App on right*

*DPR's system architecture*

*External SNAP module view showing cueing sensor at center with CWTOF optical sensors to each side of it*

Cut-away view of SNAP module components

Installation example 1: Modules on side and back shoot down, while modules along vehicle front and engine shoot up

*Installation example 2: All modules shoot up except those along vehicle rear*

*Experimental setup for testing SNAP's ability to detect and track high-speed projectile launched from an air cannon*

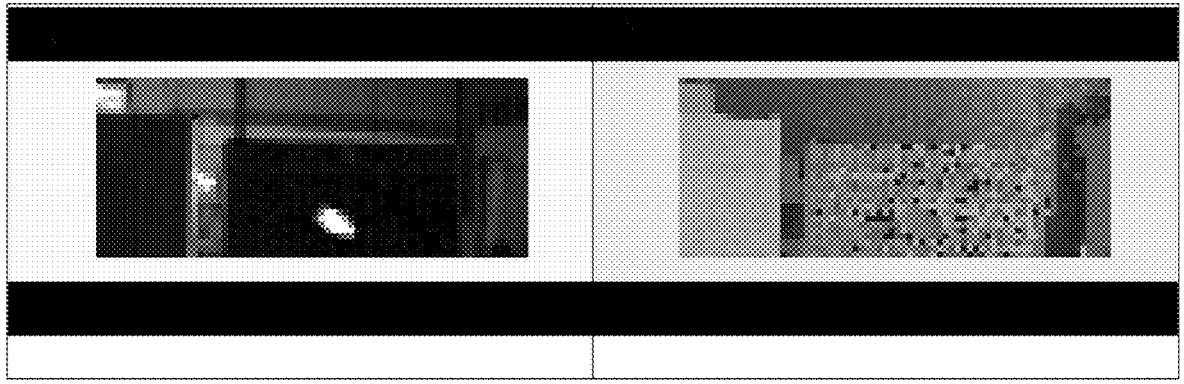
FIG. 20A  FIG. 20B
*SNAP output frames from air cannon testing*
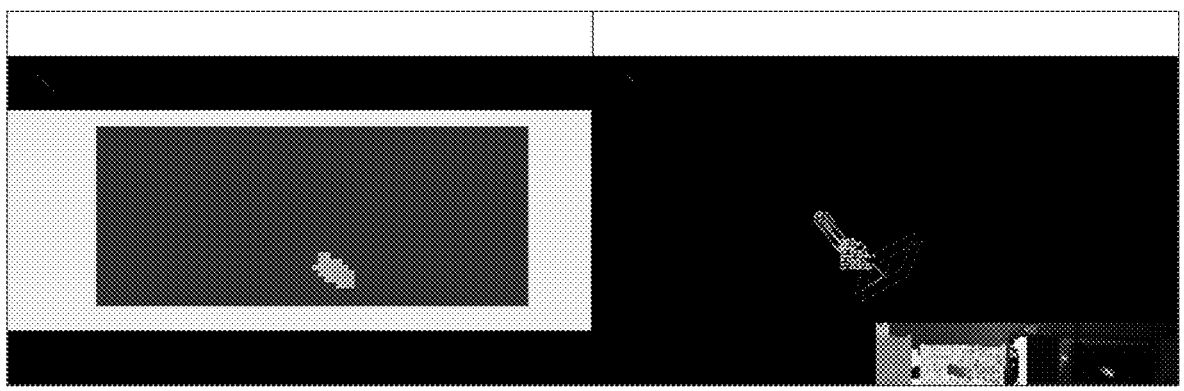
FIG. 20C  FIG. 20D

SCALABLE NETWORKED ACTIVE PROTECTION (SNAP)

CROSS-REFERENCE TO RELATED APPLICATIONS

This application claims priority from provisional application No. 63/236,990 filed Aug. 25, 2021, incorporated herein by reference.

FIELD

The technology herein relates to active protection systems (APS) and more particularly to an inexpensive, scalable APS for providing protection to vehicles and personnel from high velocity projectiles.

BACKGROUND & SUMMARY

APS technology protects vehicles by actively attacking the threat before it strikes. These systems have focused on threats, such as direct-fire rockets and missiles, that fuze upon impact with the vehicle. Hard-kill APS operates by attacking and defeating the threat before it strikes the vehicle, and it is typically organized into two classes: long-range APS and close-in APS. Both classes yield significant weight savings compared with all other forms of protection when considering fuzed threats.

APS are normally built of discrete components: radar or other sensor(s), controller housing fire control software, countermunition launcher, countermunitions, power conditioning unit and user interface(s). These are carefully integrated onto a vehicle with much attention paid to component placement, cable runs, data latencies and other concerns that knit discrete components into a system whole. Such integrations can be exceedingly time consuming and bespoke to each vehicle type. As there is only a single APS per vehicle, the economies of scale are limited.

BRIEF DESCRIPTION OF THE DRAWINGS

FIGS. 20A-20D: SNAP output frames from air cannon testing

DETAILED DESCRIPTION OF NON-LIMITING EMBODIMENTS

A new kind of active protection system (APS) called SNAP (scalable networked active protection) will be a light and affordable means of protecting vehicles and infrastructure against rockets and missiles.

Figure 1:
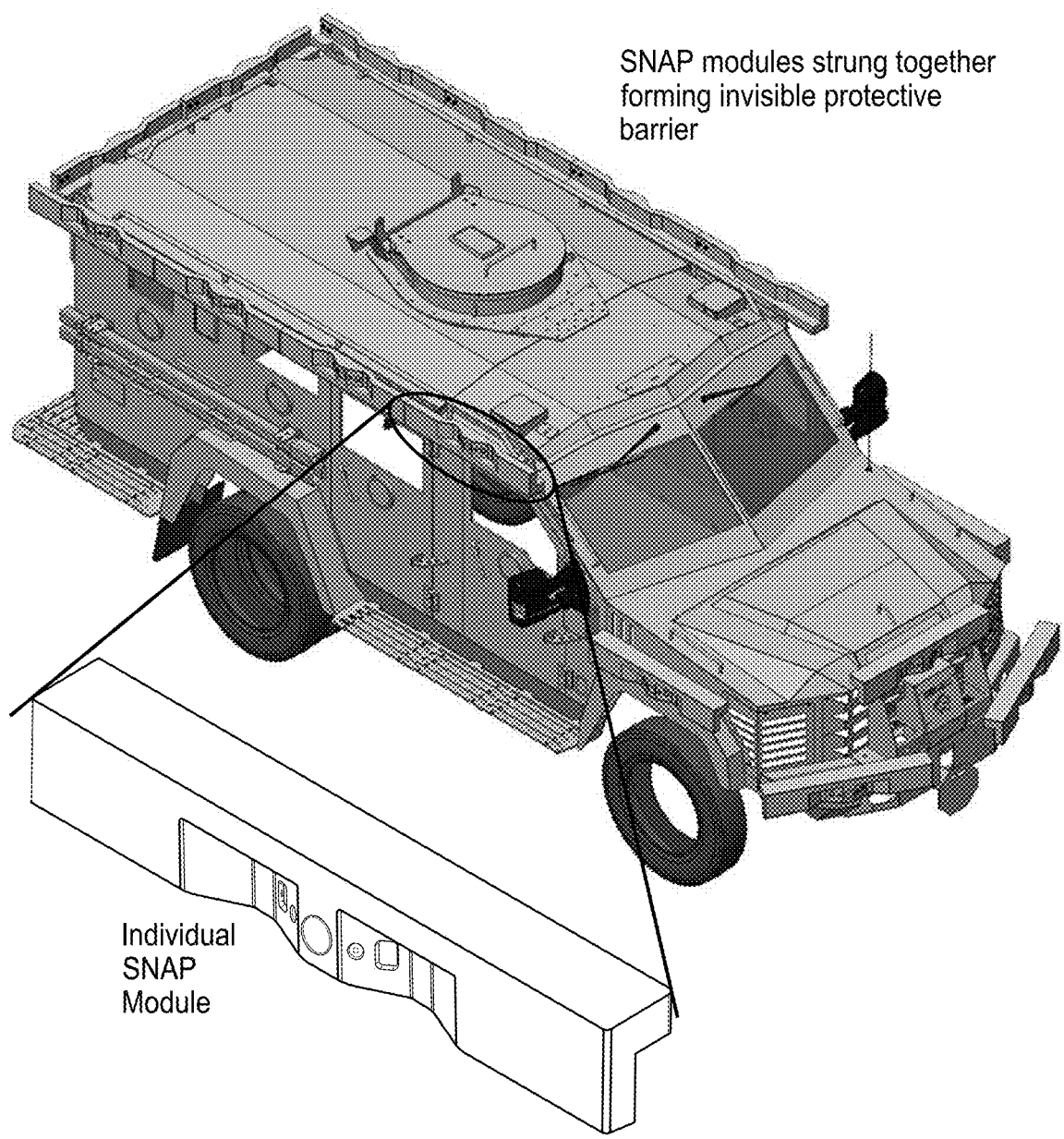
FIG. 1: SNAP modules forming a protective barrier around a vehicle

SNAP embraces a novel design approach shown in FIG. 1, where the APS system is built from modules, each of which is itself a stand-alone APS. Replicating sensors, munitions and processors over a large number of modules might initially strike some as inefficient, expensive, power-hungry and heavy. While that would certainly be the case if typical APS components were used, SNAP instead takes advantage of each module protecting a relatively small area to employ vastly lower cost components. In addition, each SNAP module is disposable in that when its countermunition is initiated, the entire module is consumed and subsequently replaced in the field. This approach allows the system to be very compact and lightweight. Finally, since each unit is a stand-alone APS, the only single points of failure are the User Interface (UI) in the vehicle cab and the Data/Power Router (DPR).

SNAP is mounted on a vehicle by attaching to light brackets that themselves are welded, bolted, or riveted to the vehicle. The UI would normally be placed in the cab, and a light cable would extend from it to the DPR, which would also be connected to vehicle power. From there, each SNAP module would be connected to the router via a cable. All of these tasks could be performed by a mechanic or technician with little to no special knowledge of how SNAP works.

Figure 2:
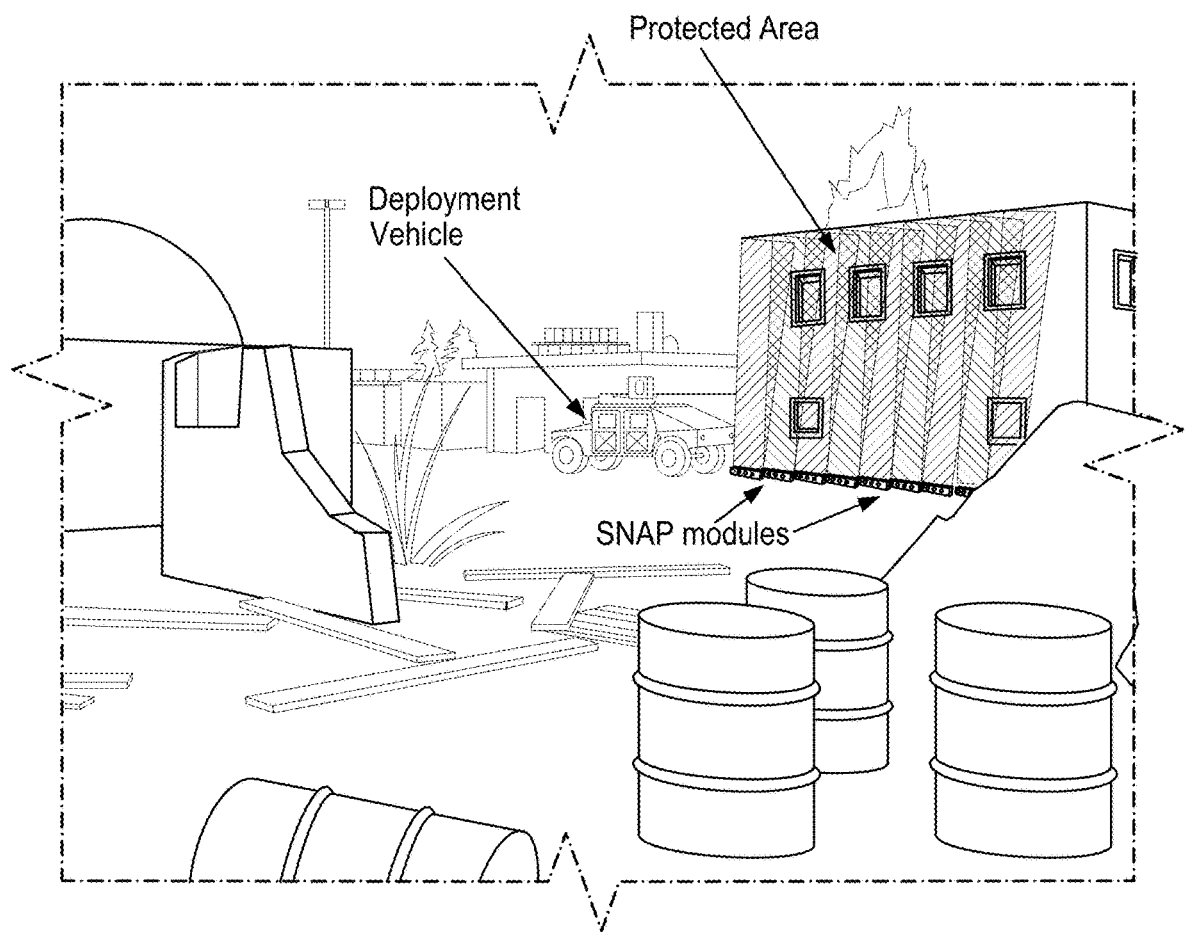
FIG. 2: SNAP deployed to protect building from direct fire missile attack.
Figure 3A:
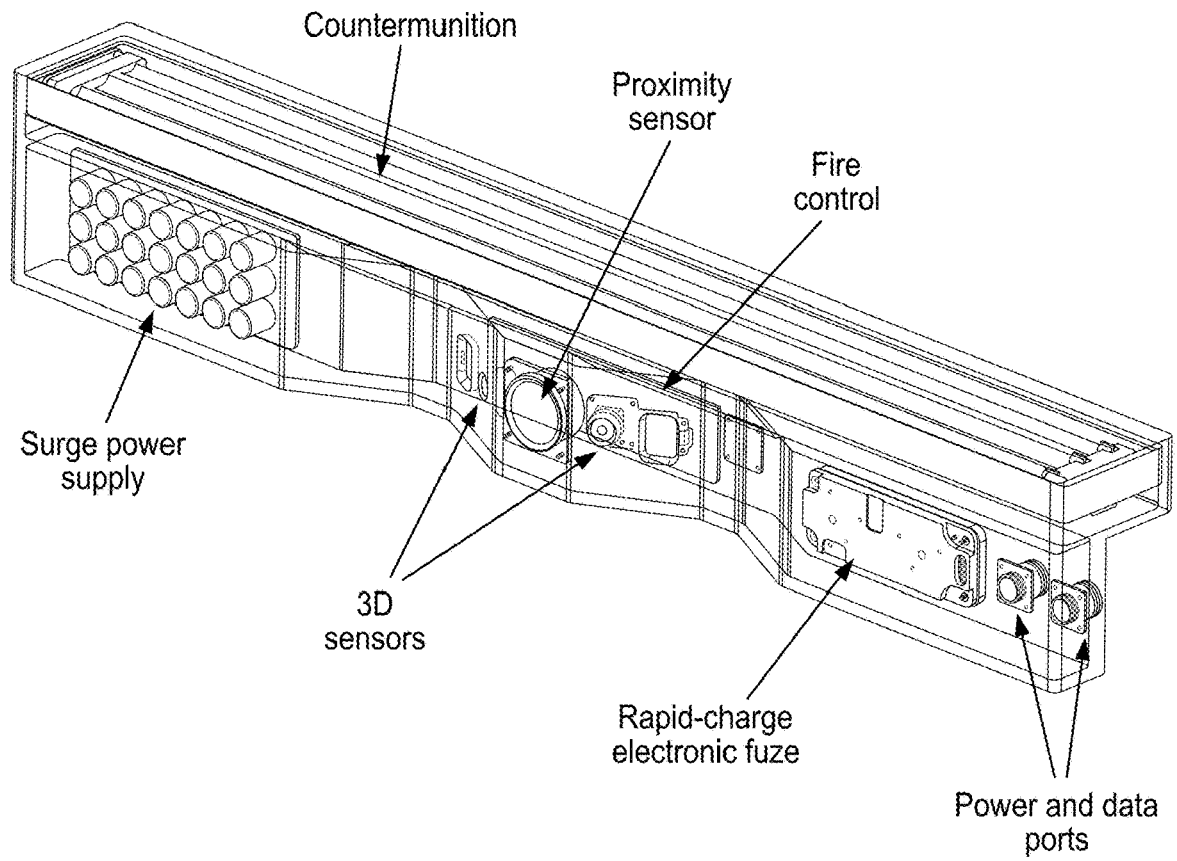
FIG. 3A: Elevated perspective view of a SNAP module depiction with uTOF, proximity sensor and CM
Figure 3B:
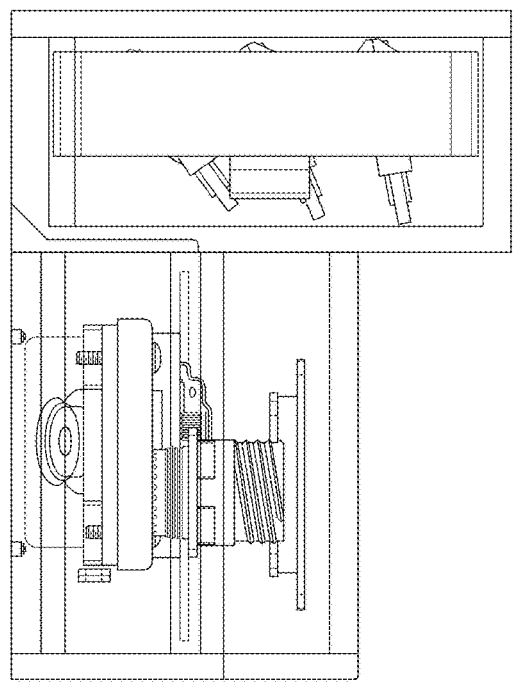
FIG. 3B: cross-sectional view of the FIG. 3A SNAP module with uTOF, proximity sensor and CM

With such low cost and ease of installation, SNAP can be used to protect structures, boats, and crew quarters—almost anything where RPGs and ATGMs are a potential threat. FIG. 2 shows a string of SNAP modules laid out to provide temporary protection to the front of a building. One could imagine such a need during a VIP visit or perhaps given a high threat status.

By being disposable, each SNAP module can be made of relatively light materials, such that the weight of a SNAP module is very light, yielding a lower weight advantage to SNAP similar to the 10× cost advantage it has over older APS technologies.

SNAP is both modular and scalable, enabling it to be tailored to the threat and price point for a particular platform type and mission profile. SNAP system cost will scale almost linearly with protected vehicle size, a desirable attribute since vehicle cost tends to scale with size, and more expensive vehicles tend to warrant more investment in their defense.

With SNAP, armies worldwide can now afford to update their fleet with previously unimagined levels of protection against some of the most lethal threats on modern battlefields.

Snap System Architecture

A SNAP system is comprised primarily of SNAP modules, with each SNAP module being a stand-alone APS in a box. All components—cueing sensor, tracking sensor, processing and countermunition—are integrated into a SNAP module. The only external components are the UI, DPR and a display app. General attributes of SNAP make it a very compelling APS choice:

- Each meter-long module is self-sufficient for extraordinary flexibility and survivability
- Defeats all RPGs and most ATGMs
- Modules are consumables—simply replace after use
- Operates on standard vehicle battery power
- Easy to install
- Excellent BIT monitoring capability
- Easy to maintain
- Secure, encrypted wireless communications for most control functions
- Exceptionally low cost
- Exceptionally lightweight
- Good multishot
- Graceful degradation—destroying one SNAP module does not disrupt others At the heart of the example non-limiting embodiment is the SNAP module, depicted in FIGS. 3A-3B, 15-18. The system is largely self-contained with its own cueing sensor, targeting sensor, fire control and countermunition (CM). There are several core technologies that enable SNAP. First, a high-speed three-dimensional (3D) sensor samples at over 1000 frames per second (fps) and builds upon earlier sensor designs that generated promising test results. So that the 3D sensor does not emit continuously, each module will be outfitted with a cueing sensor, such as a low-cost proximity sensor. Each module will be fully sealed against environmental effects, to include electromagnetic interference. A linear CM or similar munition will run the length of the module, and it will be equipped with an ability to be steered either left or right to close gaps between modules. It will fire a linear projectile that travels at a much higher speed than any threat, making for excellent kill probabilities. All processing will be conducted on an FPGA running at least one ARM core mounted directly aft of the sensors. When the system is armed, the rapid-charge electronic fuze creates a power surge that will be isolated from vehicle power by the surge power supply. The brackets holding the modules to the vehicle are designed with a permanent component attached to the vehicle and a consumable portion attached to the module. The module will basically tear away from the vehicle upon being fired, leaving the permanent attachment points in place along with the data/power connector. As already noted, the modules themselves are consumable and replaced after use by the vehicle operators once they have moved to a safe location.

Figure 4:
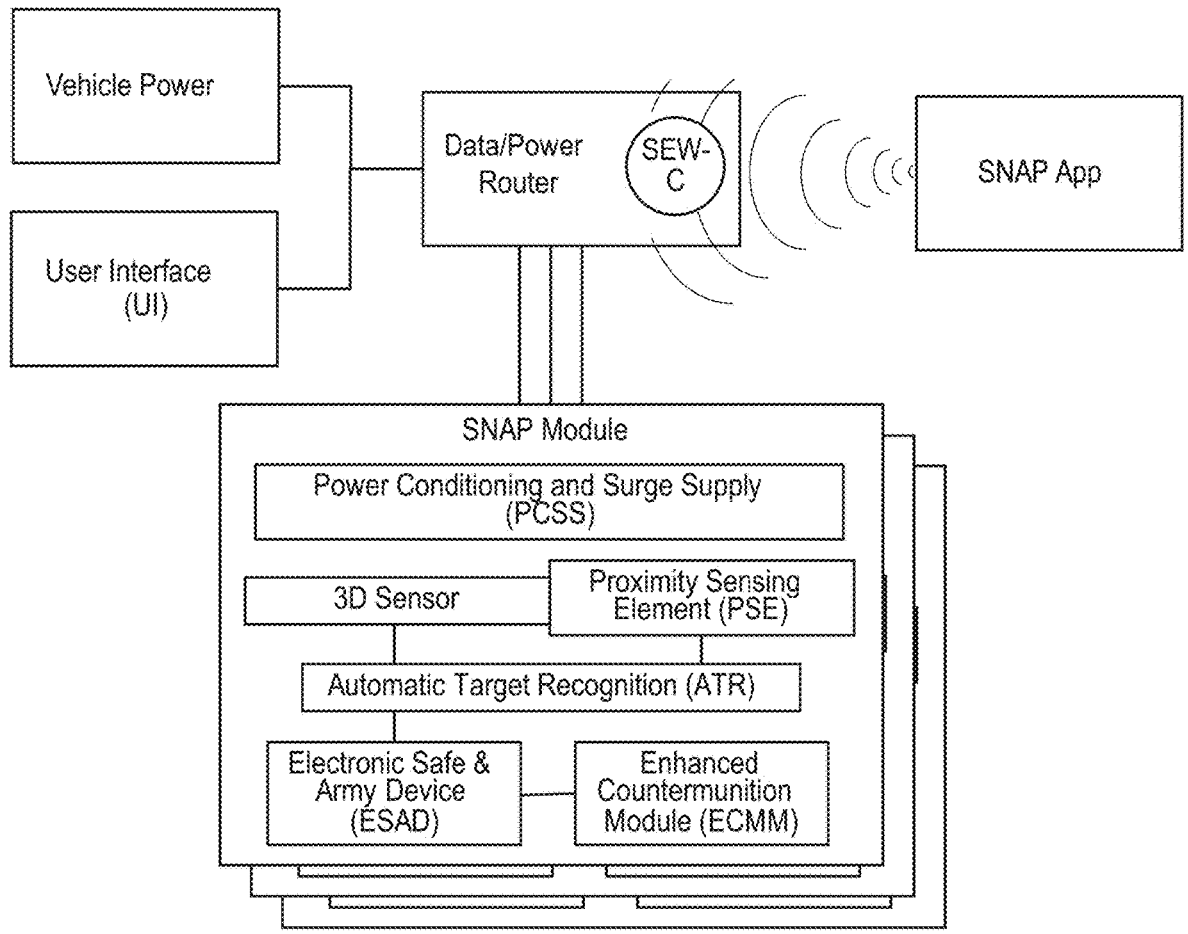
FIG. 4: SNAP system architecture

As shown in the wire diagram of FIG. 4, the SNAP architecture consists of just 2 LRUs outside of the modules themselves, greatly reducing single points of failure for the system. Components include:

- UI—Hardwired control switches are the only central control used to activate power, arm-enable, then safely arm the system.
- Data/Power Router (DPR)—
  - Routes power and UI signal to SNAP modules via star network configuration
  - SEW-C—Secure encrypted wireless communications
- SNAP App—Smailphone interface for display and BIT data collected and stored per module
- SNAP Module
  - PCSS—Power conditioning and surge power supply
  - 3D Sensor—Tracking sensor
  - PSE—RF proximity sensor
  - ATR
    - Main processor daughter board
    - Fire control
    - ESAD daughter board
  - Electronic fuze
  - ECMM—Countermunition Snap Components 3D Tracking Sensor One would normally consider short range Lidars or radars as a close-in sensor, but whereas Lidars have the required fidelity, they are far too slow to track a fast-moving object at close range in addition to being too expensive. Most radars are also too slow, and the ones in the right price range are further hampered by lacking the required accuracy.

Figure 5:
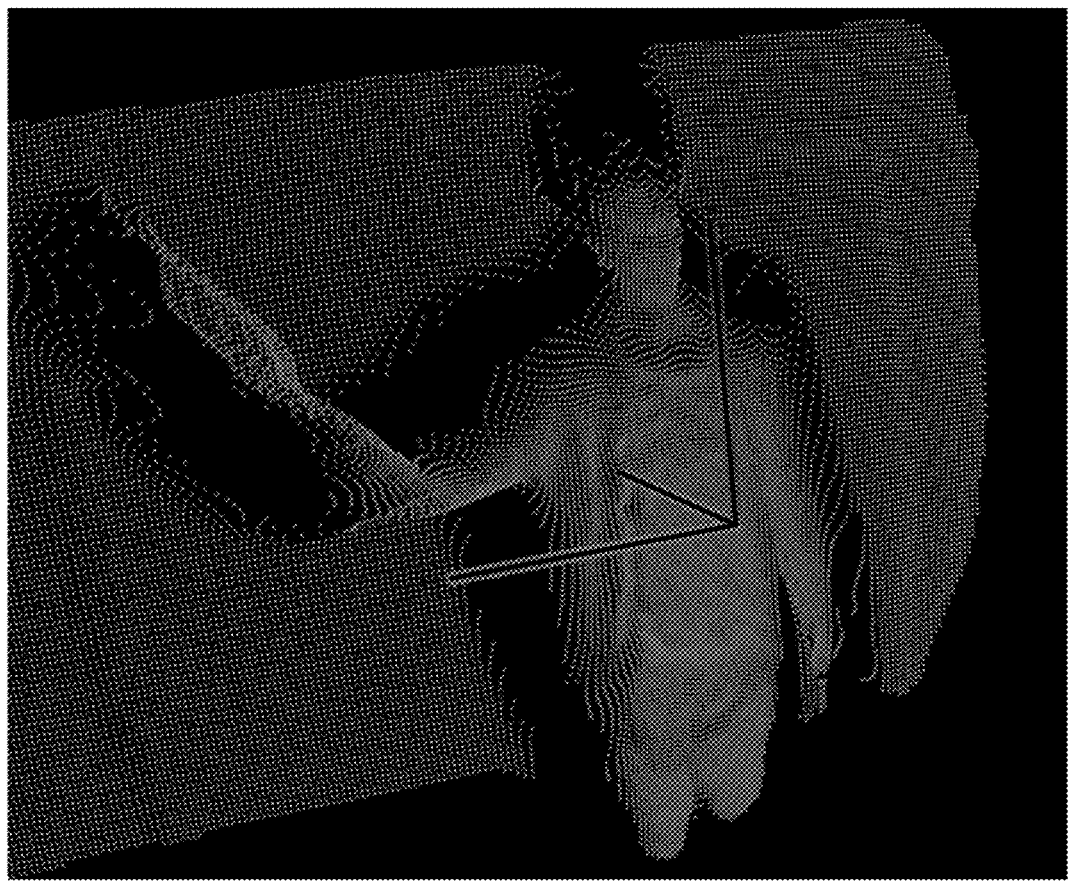
FIG. 5: 3D point cloud from a 3D Sensor

As one can see in FIG. 5, the resulting 3D Sensor creates a "Lidar-like" point cloud with sufficient pixel density to see hand gestures and sufficient sampling rate to track automobiles at highway speeds.

The 3D Sensor is packaged with an FPGA to perform edge processing such as real-time sensor control, creation of the point cloud output, object creation and object tracking. The FPGA controls all functions and communications. For example, it can select the set sensor parameters such as the integration time, gain, and region of interest (ROI) used to develop objects and tracks, and control Ethernet communications.

Figure 6:
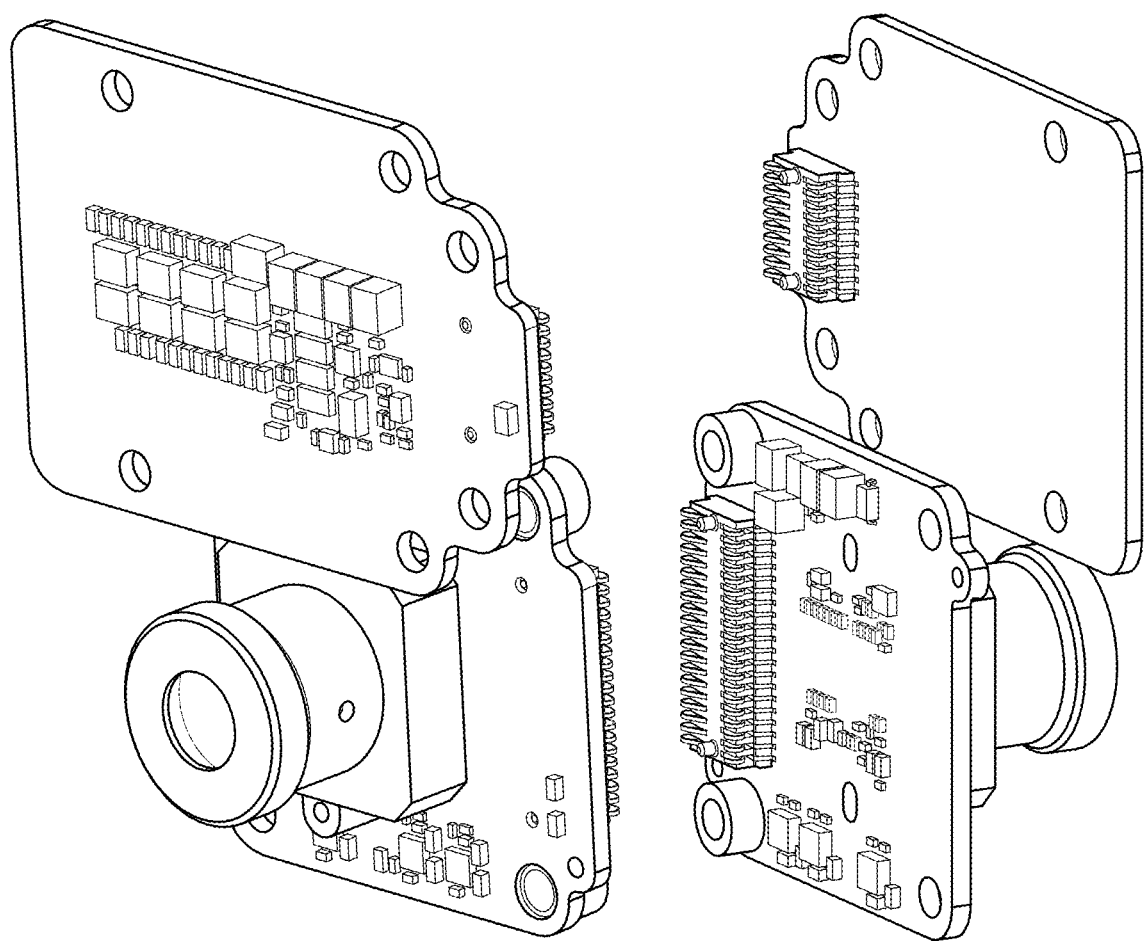
FIG. 6: Concept design of SNAP Sensor

FIG. 6 displays a new sensor/ATR. The overall form factor is slightly larger but more flexible, with two sensors and the light source separated from the sensor by a flexible cable. There are more advantageous design aspects of the SNAP development board that significantly increase its capacity to operate as an APS sensor:

- Higher frame rate—The new 3D Sensor can operate at 3 times the speed of older designs, taking the maximum sample rate from to 1500 fps or higher given other chip attributes
- More efficient sampling scheme—Prior 3D Sensors may require serial processing of measurements. This creates substantial motion blur in fast moving objects, reduces the effective sampling rate, and tends to increase noise as conditions can change between samples. The new 3D Sensor supports parallel processing of samples to be collected in the same sensor surface sweep. This is a substantial improvement when tracking fast-moving objects such as RPGs and ATGMs.
- Higher resolution—The new 3D Sensor has four times the resolution of older designs, which is beneficial for three reasons: 1) greater object location precision for better tracking, 2) greater object detail for classification, and 3) expanded FOV for better azimuth and elevation coverage.

Automatic Target Recognition

Figure 7:
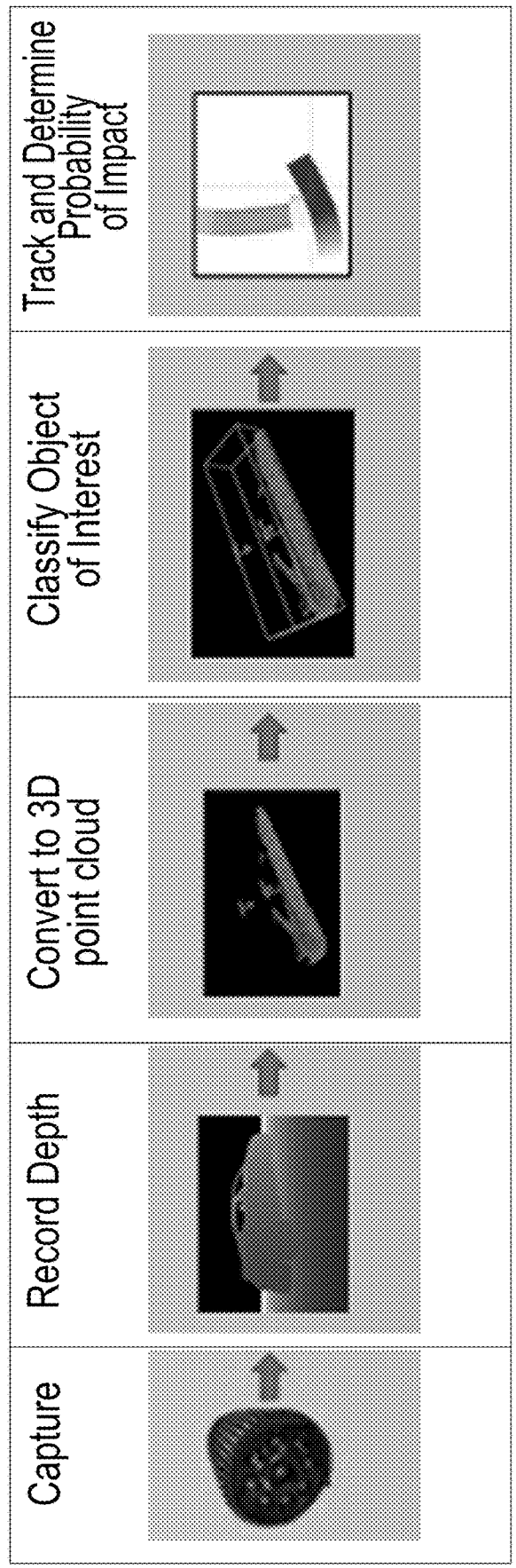
FIG. 7: 3D Sensor process flow

As shown in FIG. 7, the target tracking process flow starts with the Capture phase, where the 3D sensor collects data. This is followed by the Record Depth phase, where signal data are converted into ranges for each pixel. These depth measurements are then orthorectified into an x,y,z point cloud. The point cloud is further processed to generate and classify objects of interest. The final stage tracks any objects with motion relative to the sensor's frame of reference and predicts the time and location of any potential impact.

Figure 8:
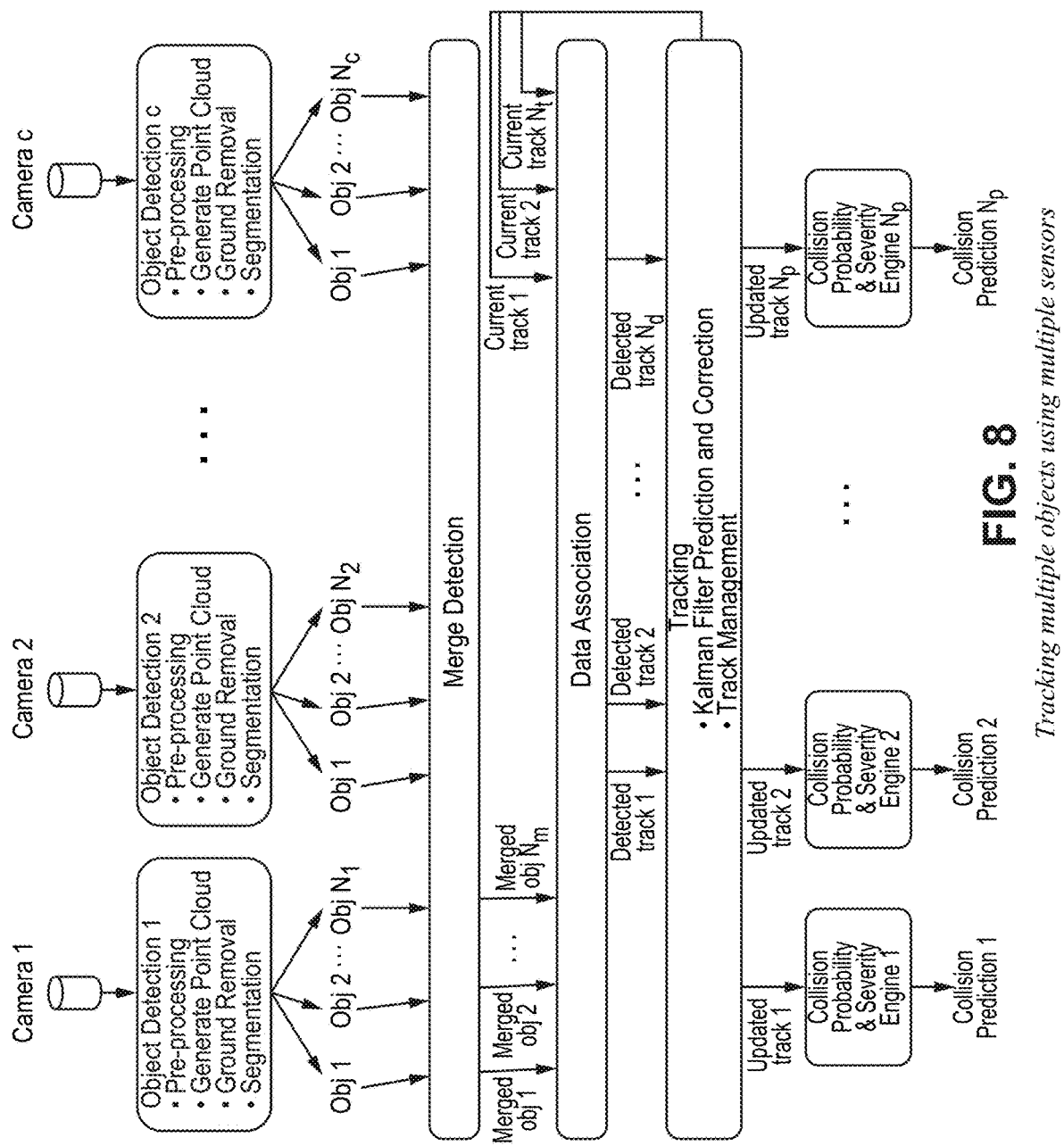
FIG. 8: Tracking multiple objects using multiple sensors

As shown in FIG. 8, the tracking process can be accomplished with a single or multiple 3D sensors. Once completed, the point cloud is parsed to remove the ground (1, 2) and define bounding boxes around all classified objects (3). Objects moving relative to the module are tracked using a standard Kalman filter with a piecewise constant acceleration estimator (4).

Cueing Sensor

Figure 9:
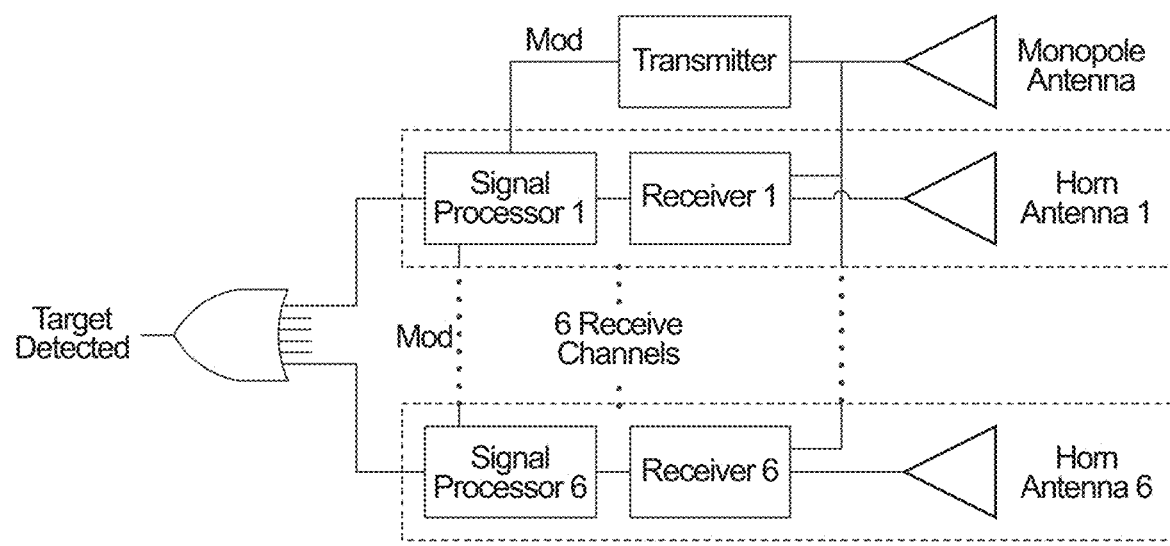
FIG. 9: Proximity sensor wire diagram

Relatively sophisticated tracking radars designed specifically for APS applications are well known. While these radars can track the threats of interest and have reasonable form factors, they are both costly and power hungry. They also output far more information than either IC or SNAP require, meaning that the cost has yet to be optimized. A low-cost alternative would be to use an RF proximity sensor (see FIG. 9) as a switch to turn on the 3D Sensor for object classification and tracking. One example proximity sensor as built by Electronic Development Corporation (EDC) is discussed along with an internal FMCW design being pursued for evaluation purposes.

An RF proximity sensor seems to be a much better fit for SNAP. The particular proximity sensor element (PRE) uses a simple horn antenna that is essentially a 3D printed shape coated with copper on the receiving side and an even simpler monopole antenna for transmission. The signals are pulled into the processor, mixed and fed into a FMCW algorithm via a set of Fourier transforms. The processing would take place on the same processor board as the ATR to further save costs. Each SNAP module would be outfitted with its own PRE, making all target processing self-contained and much easier to configure.

Secure Encrypted Wireless Communications

Wireless communications protocols have advanced in recent years to meet the demands of an increasingly crowded wireless spectrum. Different protocols have different strengths, accommodating everything from enterprise Wi-Fi systems to Internet of Things (IoT) devices. Because SNAP requires a low-latency, high-security protocol, one approach is based on Secure Encrypted Wireless Communications on Wi-Fi 6 with WAP3 authentication.

Wi-Fi 6

IEEE 802.11ax, commonly referred to as Wi-Fi 6, is the latest generation of Wi-Fi and the successor to IEEE 802.11ac. It addresses limitations of its predecessors and provides several improvements, including:
- Enhanced performance in high-density scenarios, with low latency
- Higher spectral efficiency through the use of Orthogonal Frequency-Division Multiple Access (OFDMA) modulation and 1024-QAM symbol coding
- Maximum data rates over 1 Gbps at 5 GHz operating frequency
- Reduced power consumption
- Most of the latest smailphone models support Wi-Fi 6.

WPA3

Wi-Fi Protected Access (WPA) has long been the standard for authentication over Wi-Fi. WPA3 is the latest generation, made possible by the Wi-Fi 6 standard. WPA3 provides greatly enhanced security over WPA2:
- Simultaneous Authentication of Equals (SAE) exchange instead of a pre-shared key exchange
- Robust management frame protection
- 192-bit cryptographic strength SNAP Communications The SNAP Application running on a user's smailphone will connect to the Data/Power Router and communicate as follows:

1. The app scans for unpublished Service Set Identifiers (SSID) that match values in a secure database. When one is found, the user is allowed to select it and begin the pairing process.

2. The app exchanges credentials and establishes a secure connection over WPA3. Once paired, the app and the SNAP system remember each other.

3. The app and the SNAP system exchange an additional set of application-layer encryption keys. From this point, all data is end-to-end encrypted as an extra safeguard from attacks.

4. The user is able to use the app to monitor the SNAP system.

Enhanced Countermunition Module

The countermunition module (CMM) was one of the primary cost drivers in past APS systems. They used a relatively expensive electronic fuze and a fairly sophisticated kill mechanism based on miniature Explosively Formed Projectiles (EFP) munitions. In addition, to achieve extremely high levels of multishot, past systems used 4 CMMs per 32-inch section, and to address tandem threats, two rows of CMMs were often employed, increasing that number to 8. Using so many CMMs of such a sophisticated design resulted in a relatively large munitions cost. SNAP both simplifies the CMM design and reduces the number of CMMs by almost an order of magnitude to make munitions a much smaller fraction of the overall cost.

Figure 10:
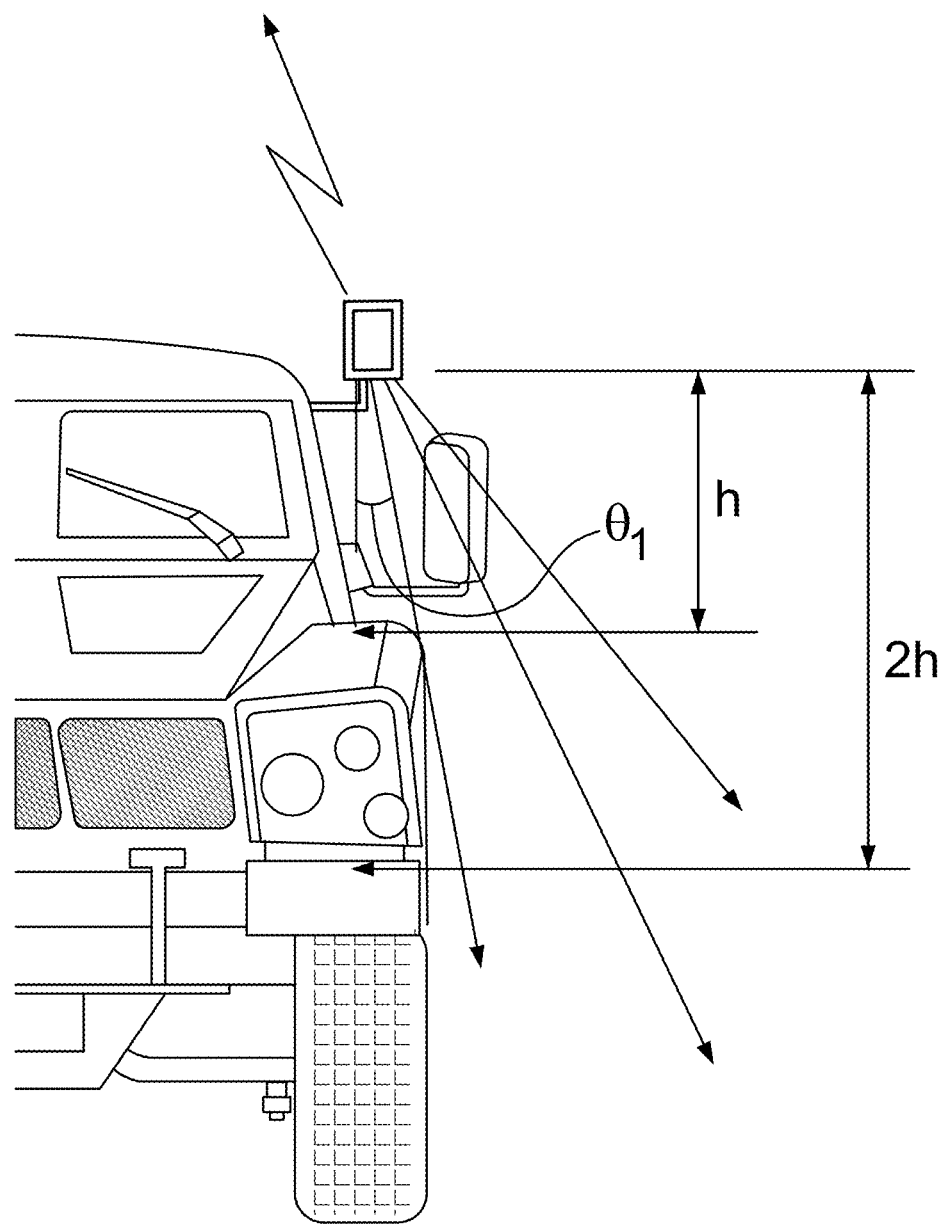
FIG. 10: Enhanced CMM concept with spreading munitions

The Enhanced CMM (ECMM) requires only a single electronic fuze per meter-long section that can defeat tandem threats with a single munition. In addition, as the neighboring electronics to the ECMM are assumed part of the consumable, the containment system can be both lighter and less expensive. Finally, the example non-limiting embodiments may include a much more affordable but still lethal kill mechanism to replace the relatively expensive EFPs. The ECMM is able to control the spread and timing of munition effects over a broad area, enabling as shown in FIG. 10, while still maintaining tight control over the effects outside the shot area so as to minimize collateral damage effects. A simple fragmenting munition would probably not suffice since the flight speeds need to be relatively high, which the specialized munition can attain.

Electronic Fuze Design

An example non-limiting electronic fuzing system is split into two subunits: an electronic safety and aiming device (ESAD)—who's electronics are located on an ATR daughter board—and a multi-point initiator (MPI).

The ESAD itself is split into two subunits. The electronics located on an ATR daughter board and the programmable logic located within the ATRs processor. The programmable logic receives a firing time from the ATR fire control and checks that fuze settings are correct. It then sends to coded fire pulse to the correct initiator at the scheduled time. Earlier ESAD designs have been simplified and miniaturized for SNAP. Current ESAD design features include:
- Discrete logic firing switch for reliability and low cost.
- FPGA for target processing
- Automotive-grade 1000Base-T1 network for reliable communications Clock forwarding synchronization interface
Humidity, barometric, IMU, accelerometer sensors
ARM1 inhibit timer circuitry to enforce safety protocols in arming process
QSPI MRAM interface for excellent memory capacity and read/write speed.

The MPI provides the coded, high-voltage pulse train to the low-energy exploding foil initiator (LEEFI) used by all Artis CMMs. The MPI steps up the vehicle voltage to a sufficiently high level to initiate the CMM.

In addition to basic fuzing capability, the MPI has many safety and other features, including:
Capable of firing 2 or more LEEFIs via attached striplines
Reaches all-fire condition extremely rapidly
9~33 VDC Protected Input
Safe Arm Sequencing Circuitry—Arm1, Arm2, and Dynamic Arm signal assertion required in that specific order to generate high voltage
Active Energy Dissipation—Forces discharge of high voltage capacitors when Arm Sequencing is asserted incorrectly, or if the system is actively disarmed
Passive Energy Dissipation—Two passive bleed down paths are present, one built into the high-voltage capacitor itself, for dissipating any residual voltage or in the event of malfunction (e.g., from battle damage).
Differential firing signals requiring correct safe arm sequencing before firing
High Voltage divided and monitored to ensure safe measurement of firing voltage Power Conditioning and Surge Power Supply The Power Conditioning and Surge Power Supply provides the SNAP modules with additional power during brief, high-load operating states. This prevents overloading of the vehicle power bus. During standby, low-load operating states, the Surge Power Supply will trickle charge itself from the vehicle power bus via the DPR. The surge power supply also provides some filtering. Energy storage is accomplished through super capacitors.

User Interface

The User Interface (UI) meets the requirements of MIL-STD-1911A. This device allows the user to arm and disarm the system and would be mounted near the vehicle commander.

The current system has four dual-action switches, three for arming the system and one for providing a status check. The switches must be manually operated in the correct sequence before the system can be set to an arm-enabled state:
Switch 1—Power: Enables power to each SNAP module.
Switch 2—BIT: Runs a full-system diagnostic on SNAP modules.
Switch 3—ARM 1 (ARM-ENABLE): First of two static interrupts to arming energy.
Switch 4—ARM 2 (ARM): Second static interrupt to arming energy.

The dimmer knob allows the user to adjust the intensity of the status lights for compatibility with night vision goggles.

Figure 12:
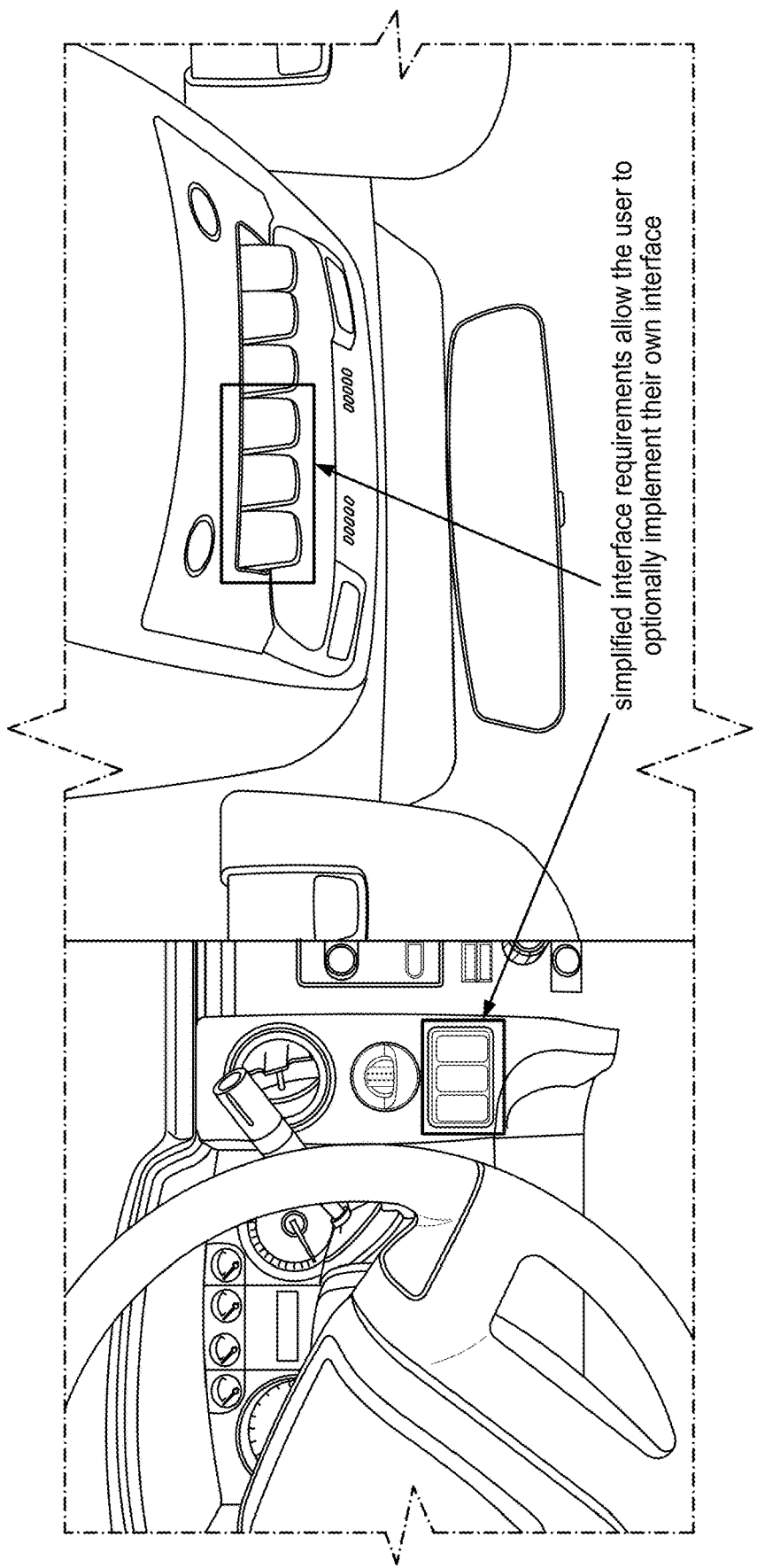
FIG. 12: UI may potentially be implemented with existing vehicle switches

The SNAP UI will operate with similar principles but with fewer components and reduced cost. Having fewer components and a simplified interface allow for alternate UI implementations by the customer—integrating control directly into unused vehicle switches as shown in FIG. 12.

SNAP App

Figure 11:
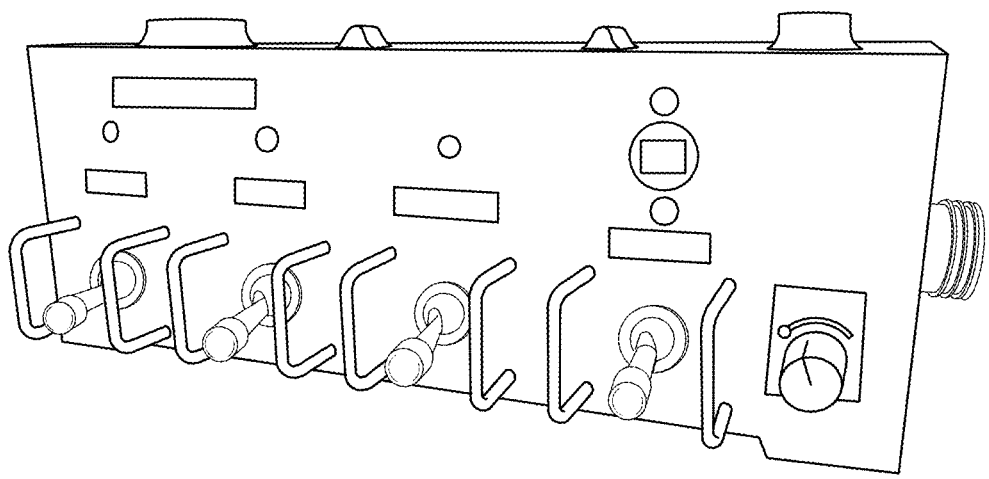
FIG. 11: Iron Curtain User Interface
Figure 13:
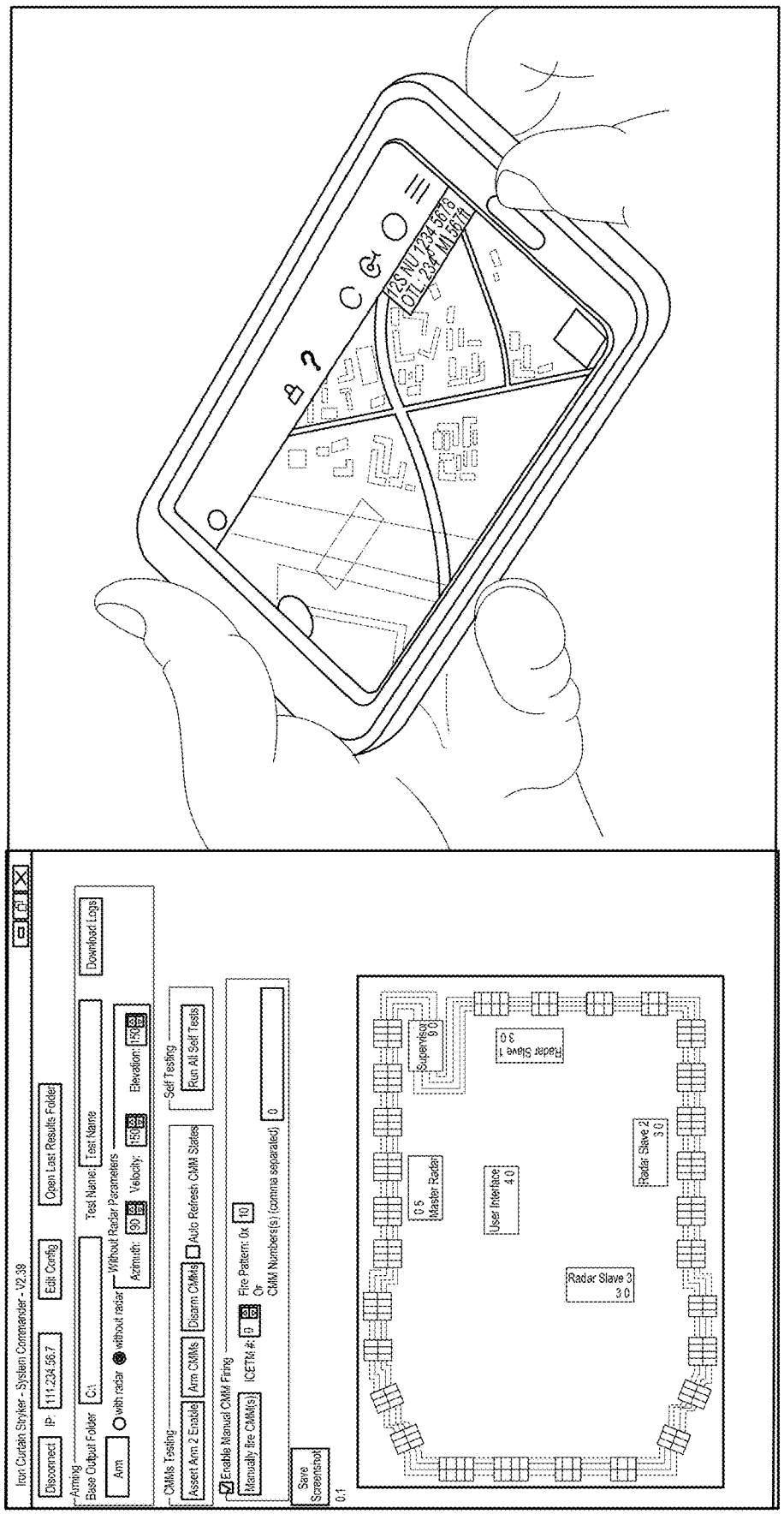
FIG. 13: System Commander display on left, and notional view of SNAP App on right

Prior APS displays such as the System Commander shown in FIG. 13, is typically housed on a Toughbook securely mounted in the crew cab. This adds cost and takes up valuable internal space. As battlefield smartphones are becoming more common, the example non-limiting embodiments ports the System Commander to a "SNAP App" that would have similar functionality but redesigned for smailphone use. For convenience, the app could be configured so that it downloads data wirelessly from the system, but for security, data may only be uploaded via a wired connection. App functions include:
Output threat trajectory on map
Realtime system status updates (module readiness, remaining modules after attack)
Maintenance (BITS)
All attack and other event data saved for after-action analysis and display Power/Data Router Some previous systems contained an expensive and complicated central control unit that handled distribution and conditioning of power, data, and safety critical signals. See FIG. 11. In SNAP the system architecture is simplified, and interface bandwidth requirements are reduced but the DPR remains the nexus of the system design. This unit is correspondingly smaller and may be easily located in the cab of the vehicle for simpler installation if desired.

The DPR for SNAP receives power from the vehicle, filters, and steps the voltage up for more efficient distribution and reduced module size. There is additional power control functionality to disable power to expended or damaged SNAP modules, providing robust system operation.

The DPR also contains a data processor that receives low bandwidth information and coordination from each of the SNAP modules and uses SEW-C to pass information to the SNAP App. The data processor may also receive wired information for system updates and other operations not handled by the SNAP App.

Figure 14:
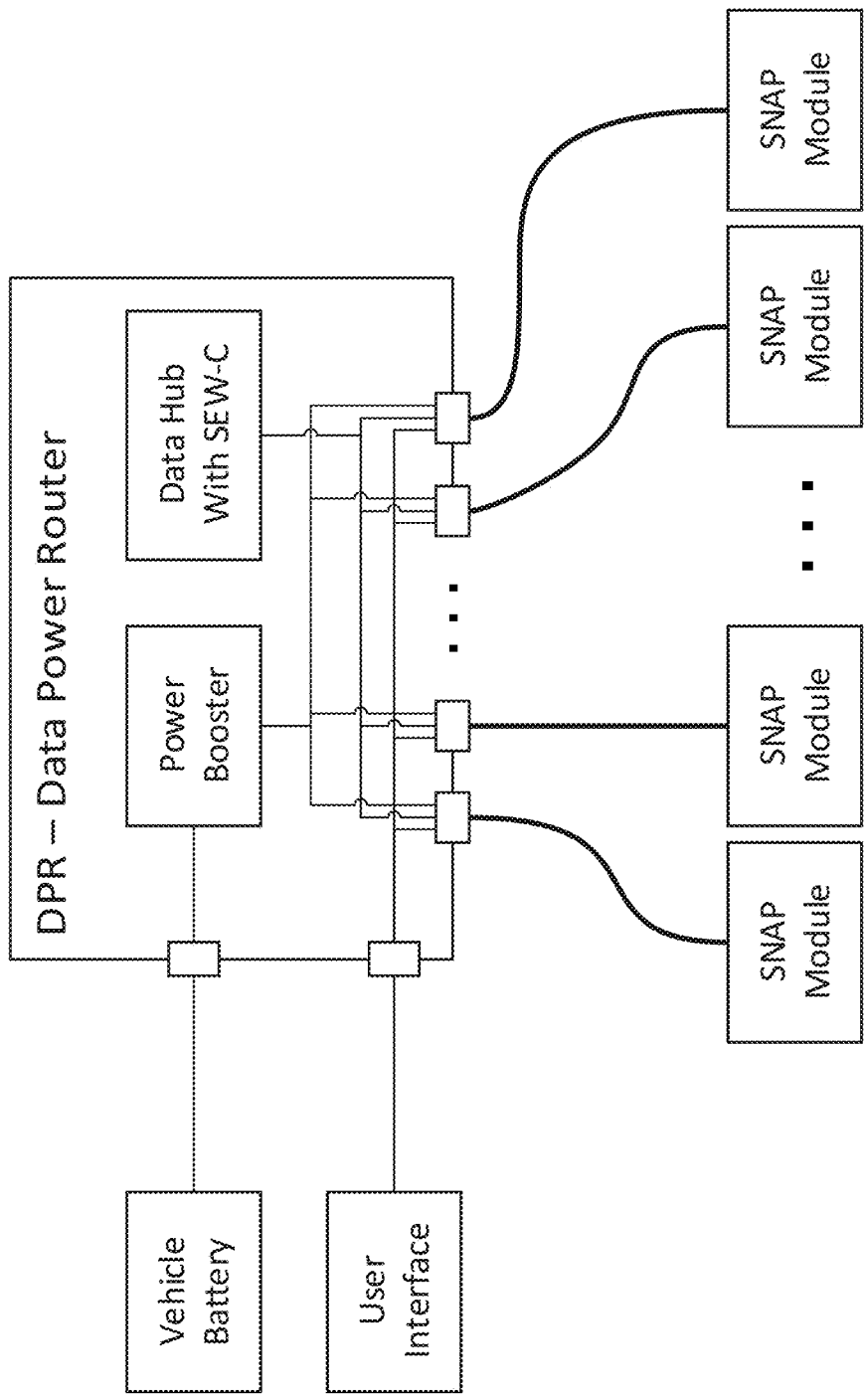
FIG. 14: Data Power Router (DPR)'s system architecture

Finally, the DPR connects to the UI and passes the safety and power control signals. The DPR's position in the system architecture and general structure are shown in FIG. 14.

Snap Module Design

Figure 15:
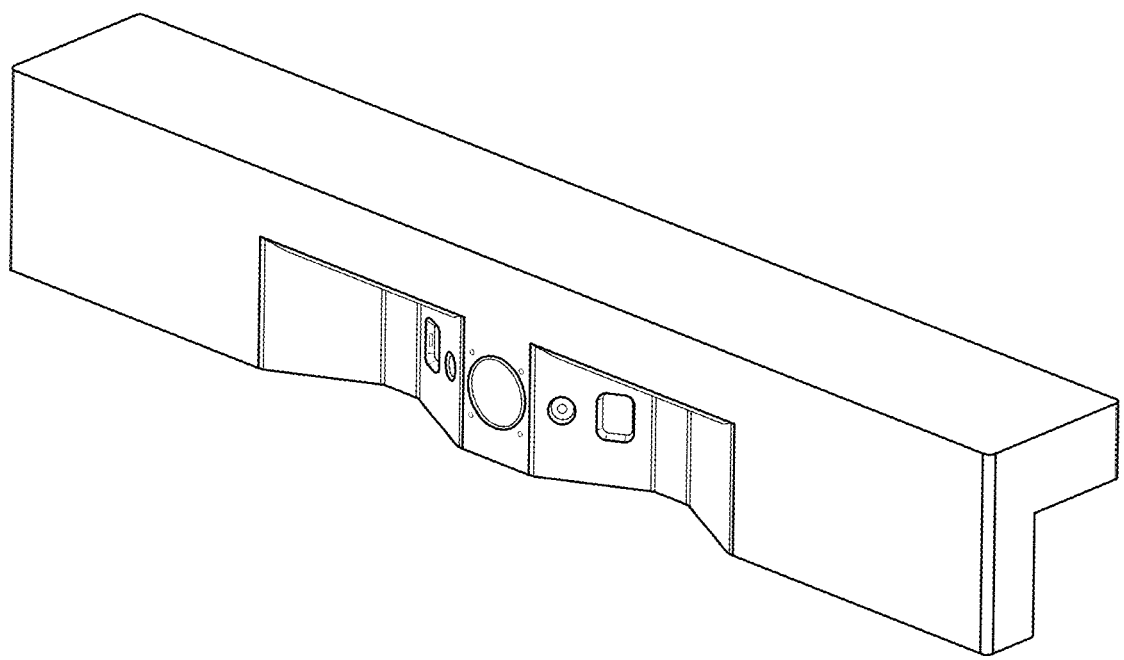
FIG. 15: External SNAP module view showing cueing sensor at center with CWTOF optical sensors to each side of it
Figure 16:
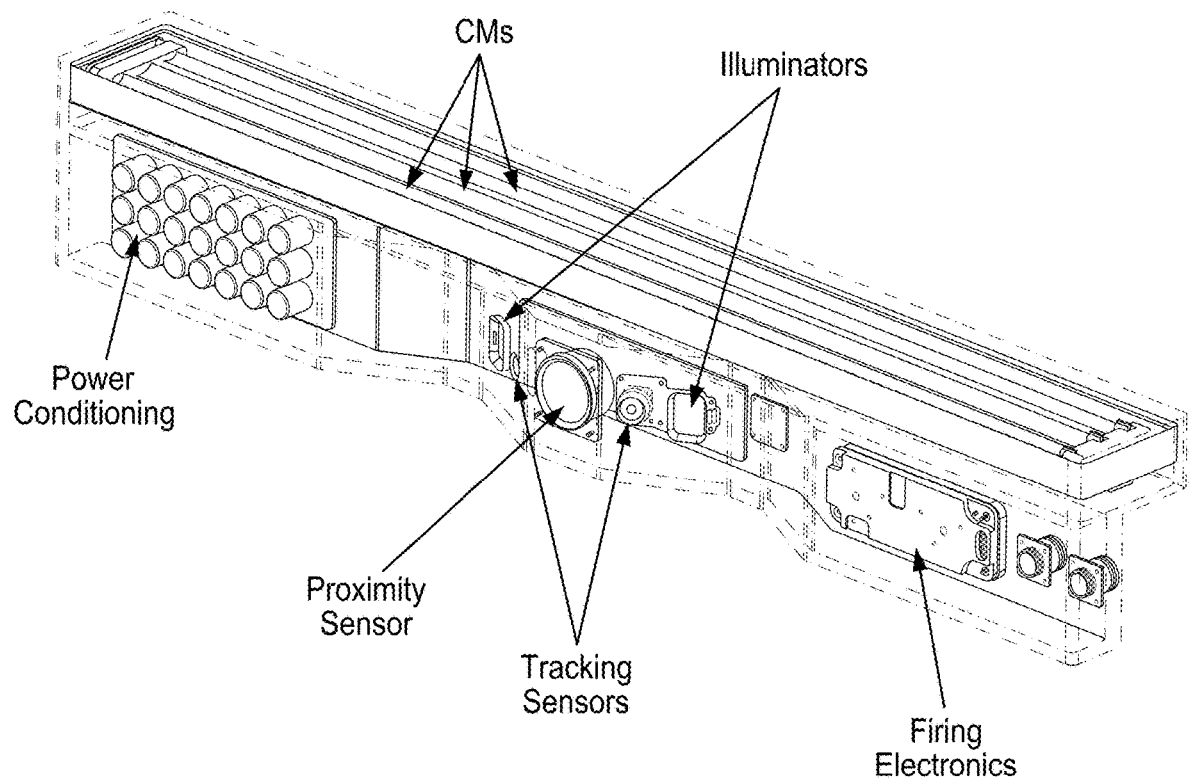
FIG. 16: Cut-away view of SNAP module components
Figure 17:
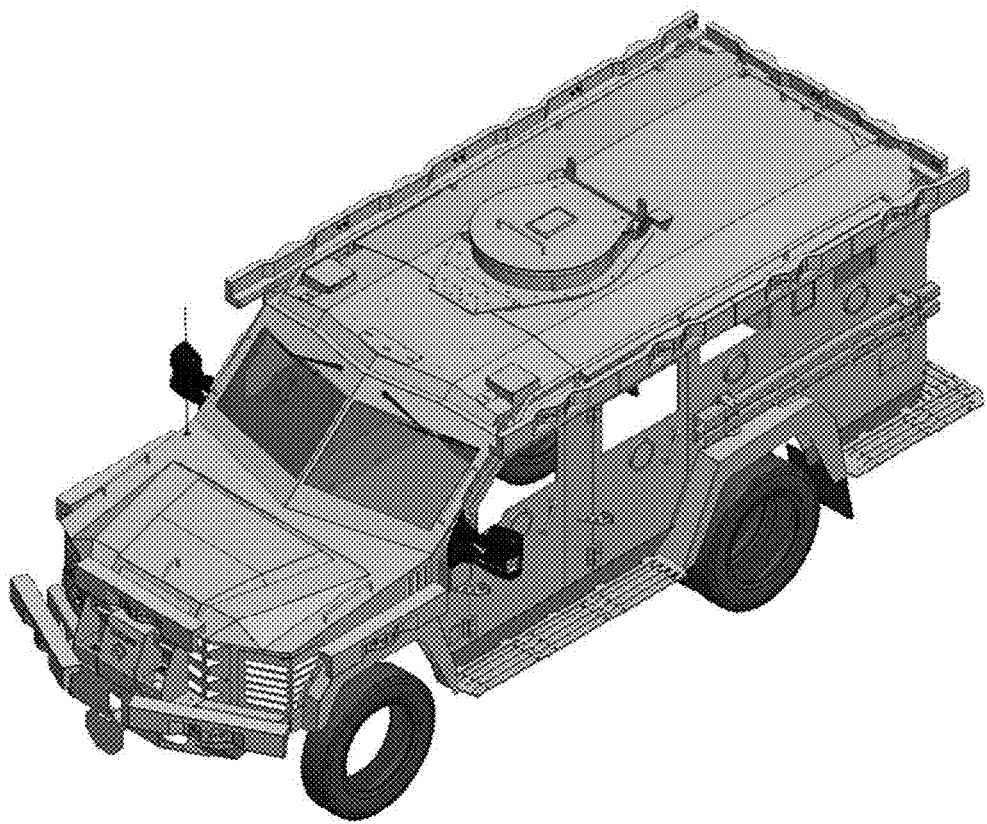
FIG. 17: Installation example 1: Modules on side and back shoot down, while modules along vehicle front and engine shoot up
Figure 18:
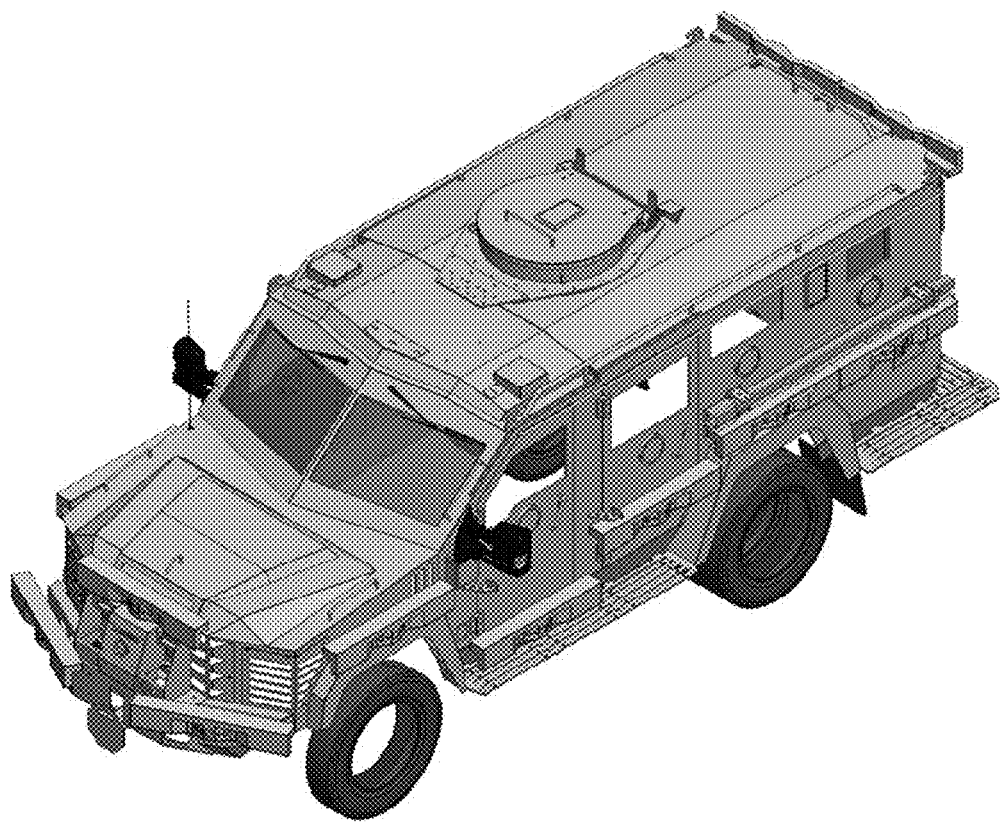
FIG. 18: Installation example 2: All modules shoot up except those along vehicle rear

The SNAP module is designed with low cost, low weight, and ease of integration as the primary design drivers. As an external view in FIG. 15 shows, the module is entirely sealed with apertures for the cueing and tracking sensors. Although not required, the cueing sensor may be housed in the center of the module to give it a symmetric view of threats that may attack from any angle.

Each SNAP module contains a cueing sensor (proximity sensor or similar), a tracking sensor (3D Sensor), surge power supply (PCSS), fire control processing (ATR with ESAD), an electronic fuze, a munition (ECMM), and connectors for data and power. In this design instantiation, the 3D tracking sensors are located on either side of the cueing sensor, each with its emitter and detector components located side by side. The ATR is located physically close to the sensors to reduce internal component cost and reduce unnecessary latencies. The fuze, and PCSS as well as the connectors are located to the sides of these sensing components since their location inside the module has less influence on its functionality.

The ECMM is located above or behind the electronics. While shown at the top of the module here, the ECMM can also be placed along the bottom or even the back of the module (as may be useful for some top-attack designs). A lightweight containment box around the ECMM protects the vehicle and neighboring modules from damage when an ECMM is expended.

The entire module housing is constructed from aluminum or other lightweight material with mounting points on the front for optional armor plating. Mounting points on the back are positioned so that once the module is consumed another module can easily be mounted in its place. The cable connected to the module is short and also consumed with the module leaving a nearby connector protected and ready for re-use.

The module is comprised of all solid-state components and designed to survive use in military environments. This includes but is not limited to the following, mostly defined in MIL-STD-810H and MIL-STD-461G:
  Shock and vibration
  Ingress protection from salt spray, rain, submersion, cleaning spray, environmental debris such as sand and dust, and petroleum products
  EMI protection to frequencies specified in MIL-STD-461G with special attention paid below 4 GHz
  Extended solar loading and thermal shock Example Vehicle Installation The SNAP design module-centric approach allows for high flexibility in terms of optimizing the protection for the given vehicle and user needs. Examples of this flexibility are shown in two examples, one in which most protection is provided by modules shooting down and another in which all protection modules shoot up.

In the first example, protection is optimized for threats coming from the sides and rear, and above from the front. Of further note is the fact that adding the SNAP modules does not increase the vehicle length, width, and height.

In the second example, protection is optimized for the front and sides, as well as optimizing protection for threats attacking the roof.

Experimental Results

Figure 19:
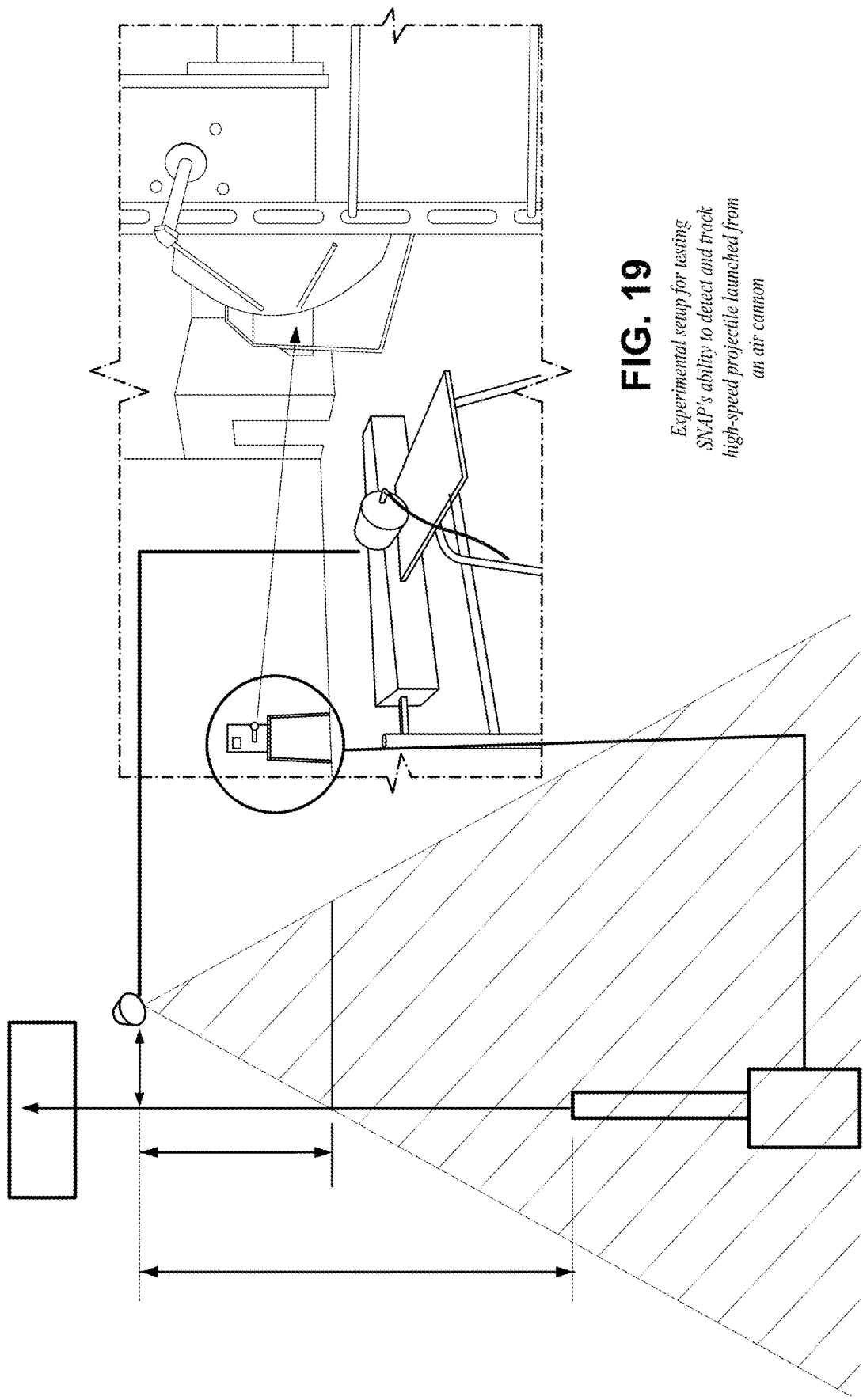
FIG. 19: Experimental setup for testing SNAP's ability to detect and track high-speed projectile launched from an air cannon

An earlier version of the 3D Sensor collected data that was then post-processed primarily using routines already described (3D point cloud formation, object formation, tracking). The sensor was tested by shooting a foam "RPG" travelling at 80 m/sec past the sensor, with the configuration as shown in FIG. 19. The gun was at 8.8 m range and the HFOV of the sensor set to its normal 108°.

FIGS. 20A-20D show four different images numbered 1 through 4 of the same shot at roughly the same point in time. The 3D Sensor outputs two types of data streams: amplitude (image #1) and 3D point cloud (image #2). The point cloud is subsequently processed to remove the background (image #3). The remaining point cloud data are then run through an objectifier/tracker that turns neighboring points into an object and then tracks them over time (image #4).

The system showed excellent ability to detect, classify and track the projectile sampling at 500 fps.

Snap Product Line

On many modern battlefields, there is little distinction between front lines and the rear. Add this to growing concerns about fighting in urban areas, and it becomes clear that many armies will desire to improve the protection of lower cost logistic vehicles, tactical wheeled vehicles (TWV) and light armor. However, as armies possess far more trucks than tanks, with each platform costing far less, outfitting light vehicles with the current generation of APS, with costs surpassing $1M each, is simply not feasible.

SNAP is created to bridge the gap between protection needs and affordability. It is readily customizable to allow armies to select the types of threats they most want to defend against while making the hard decisions on the price that they can afford. For example, a SNAP version that protects against unitary RPGs only would be less costly than one that adds tandem RPGs and small ATGMs to the threat set.

To achieve this, SNAP is offered as a product line from a base model that protects against unitary RPGs only to a more substantial premium version that extends the threat set to tandem RPGs, many types of ATGMs, and tank-fired HEAT threats. All models, however, will have module characteristics as listed:
  Extremely low weight (<40 lb)
  Extremely low power (<25 W)
  1 m length
  User Interface
  Data/Power Router
  Encrypted smailphone app interface (SNAP App)

The invention claimed is:

1. A modular active protective device that is consumed by counter-measure initiation, the modular active protective device comprising:
  a housing;
  a processor disposed in the housing;
  a cuing proximity sensor disposed in or on the housing,
  a high-speed 3D tracking sensor and an associated illuminator disposed in or on the housing,
  a counter-munition disposed in or on the housing, and
  firing electronics disposed within the housing and including a processor coupled to the cuing proximity sensor, the high-speed 3D tracking sensor and the counter-munition, the processor configured to automatically initiate the counter-munition in response to inputs from the cuing proximity sensor and the tracking sensor,
  wherein initiating the counter-munition consumes the processor, the cuing proximity sensor, and the high-speed 3D tracking sensor.

2. A protection system comprising a plurality of modular protective devices of claim 1.

3. The modular active protection device of claim 1 wherein the counter-munition extends along at least one dimension of the housing and the processor is structured to steer deployment of the counter-munition in the at least one dimension.

4. The modular active protection device of claim 1 wherein the counter-munition comprises a high-speed linear projectile.

5. The modular active protection device of claim 1 further comprising a power conditioning and surge power circuit within the housing that isolates the device from an external power supply.

6. The modular active protection device of claim 1 wherein the processor is configured to interact with a smart device application.

7. The modular active protection device of claim 1 wherein the high-speed 3D tracking sensor generates a 3D point cloud.

8. The modular active protection device of claim 1 wherein the processor is configured to automatically recognize and track targets and generate a prediction of timing of any potential impact.

9. The modular active protection device of claim 8 wherein the processor is configured to track objects with a Kalman filter and a piecewise constant acceleration estimator.

10. The modular active protection device of claim 1 wherein the cuing proximity sensor comprises an RF proximity sensor and the processor is configured to process outputs of the RF proximity sensor using Fourier transforms.

11. The modular active protection device of claim 1 wherein the device further comprises a wireless tranceiver connected to the processor, the wireless transceiver performing secure encrypted wireless communications with another modular active protection device(s) and/or a smart device providing a user interface.

12. The modular active protection device of claim 1 wherein the processor is configured to control spread and timing of the counter-munition over an area.

13. The modular active protection device of claim 1 further including an electronic fuzing system comprising an electronic safety and arming device and a multi-point initiator.

14. The modular active protection device of claim 1 that discovers and communicates with similar modules in local vicinity, such as mounted on a common vehicle.

15. The modular active protection device of claim 1 wherein the device is capable of using counter-munitions given that the device is not restrained by any need to protect the sensors and the processor from damage upon initiation of the counter-munition.

16. The modular active protection device of claim 1 wherein the device is configured to be installed and operate with a cable connecting it to standard vehicle power.

17. The modular active protection device of claim 1 wherein the device is configured to protect a limited area.

18. The modular active protection device of claim 1 wherein the device is configured to communicate and coordinate with at least one further modular active protection device structured according to claim 1.

* * * * *